United States Patent [19]
Olson

[11] Patent Number: 6,059,852
[45] Date of Patent: May 9, 2000

[54] PLASTIC INJECTION MOLDED FURNACE FILTER

[76] Inventor: Kenric J. Olson, 2885 Upper 79th Ct. East, Inver Grove Heights, Minn. 55076

[21] Appl. No.: 09/168,160

[22] Filed: Oct. 8, 1998

[51] Int. Cl.$^7$ .................................................. B01D 46/012
[52] U.S. Cl. ................................. 55/495; 55/481; 55/500; 55/506; 55/508
[58] Field of Search .............................. 55/495, 500, 501, 55/508, 481, 496, 506; 210/314, 317

[56] References Cited

U.S. PATENT DOCUMENTS

| 3,076,303 | 2/1963 | Durgelou . | |
|---|---|---|---|
| 3,470,680 | 10/1969 | Avera | 55/508 |
| 4,732,675 | 3/1988 | Badolato et al | 55/501 |
| 5,464,461 | 11/1995 | Whitson et al. . | |
| 5,725,623 | 3/1998 | Bowerman et al. . | |
| 5,766,285 | 6/1998 | Killman | 55/508 |
| 5,788,729 | 8/1998 | Jurgensmeyer | 55/506 |
| 5,792,230 | 8/1998 | Moore et al | 55/501 |

FOREIGN PATENT DOCUMENTS 62-74426   4/1987   Japan .

*Primary Examiner*—David A. Simmons
*Assistant Examiner*—Minh-Chau T. Pham
*Attorney, Agent, or Firm*—Richard C. Litman

[57] ABSTRACT

A furnace air filter includes a structure which has two identical rectangularly shaped grid members. The grid members are joined together at one side by a hinge, which hinge is made of the same plastic material as the grid members. The grid members and hinge are integrally formed preferably by an injection molding process. A filter media is placed between the grid members so as to form a filter unit adapted to be positioned in the filter track of a furnace air duct. The plastic grid structure is reusable, requiring the replacement of only the filter media.

8 Claims, 1 Drawing Sheet

PLASTIC INJECTION MOLDED FURNACE FILTER

BACKGROUND OF THE INVENTION

1. Field of the Invention

The present invention generally relates to a fluid filter. More specifically, the present invention is drawn to a plastic injection molded frame for holding air filter media in a furnace.

2. Description of the Related Art

Almost all central air heating systems used in modern homes require an air filter. The purpose of the air filter is to rid the incoming air of dust and pollen which may cause breathing difficulties. Filtering the incoming air is especially critical for those who suffer from allergic reactions which are triggered by pollen/dust borne air.

Many heating systems position the air filter in a guide track located in the air inlet duct. Typically, the air filter is a unit comprising filter media encased in a cardboard frame and covered with wire mesh. When the filter media becomes laden with pollen and dust, the entire unit (cardboard frame, wire mesh, and filter media) is removed from the guide track for disposal and replaced with a new unit. The above filter replacement process is expensive in that the relatively costly cardboard frame and wire mesh are wastefully disposed.

The following patents show other types of air filter arrangements. U.S. Pat. No. 3,076,303 (Durgeloh) discloses air filter media encased around its perimeter by a plastic frame. U.S. Pat. No. 5,464,461 (Whitson et al.) discloses an air filter unit for an avionic line replacement unit box. U.S. Pat. No. 5,725,623 (Bowerman et al.) discloses an air filter unit for a vacuum cleaner. Japanese Patent 62-74426 discloses media encased around its perimeter by a metallic frame.

None of the above inventions and patents, taken either singularly or in combination, is seen to disclose a plastic injection molded furnace filter unit as will be described and claimed in the present invention.

SUMMARY OF THE INVENTION

The present invention comprises a rectangular shaped, injection molded plastic grid structure. The structure includes two identical grid frames fastened together at one side with a hinge. The hinge is made of the same plastic as the frames and is integral therewith, thereby forming a living hinge. Filter media is disposed between the two frames such that the filter media will be pinched between the frames when the frames are folded at the hinge, thus forming a filter unit. The formed filter unit is adapted to be inserted into the filter track of a furnace's air inlet duct. The filter track will automatically hold the unit in its folded position in the air inlet duct. Because the molded frame is reusable, only the filter media need be replaced when necessary. The molded frame is sized to fit the popular standard 20×25 inch air duct track. It is obvious, however, that the frame may be easily cut to fit smaller track dimensions.

Accordingly, it is a principal object of the invention to provide an air filter unit adapted for insertion in a standard sized track of a furnace air duct.

It is another object of the invention to provide an air filter unit having a reusable molded frame.

It is a further object of the invention to provide an air filter unit which can be easily cut to fit air duct tracks having dimensions smaller than standard.

Still another object of the invention is to provide an air filter which requires replacement of only the air filter media.

It is an object of the invention to provide improved elements and arrangements thereof for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
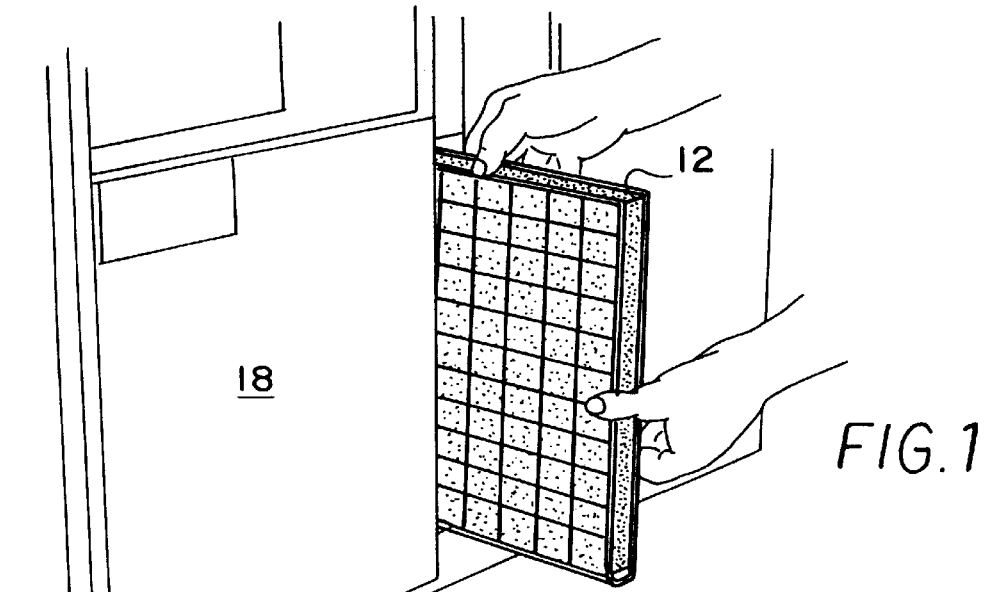
FIG. 1 is an environmental, perspective view of a plastic injection molded furnace filter according to the present invention.
Figure 2:
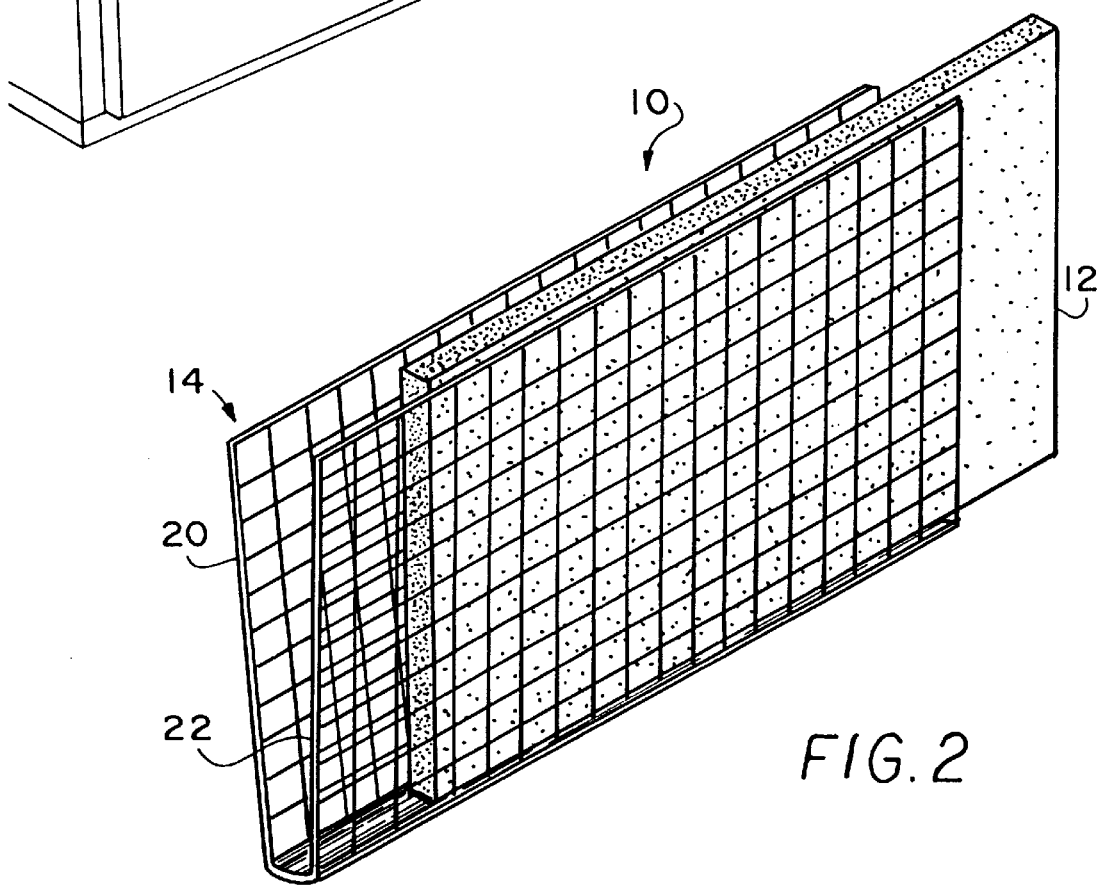
FIG. 2 is a perspective view of the grid structure with a partially inserted media filter according to the present invention.

The present invention, as illustrated in FIGS. 1 and 2, is drawn to an air filter unit generally indicated at 10. The filter unit 10 comprises filter media 12 enclosed in a molded plastic grid structure 14. Filter unit 10 is adapted to be inserted into the filter track 16 of a furnace air duct 18.

As best seen in FIG. 2, grid 14 is formed as two rectangularly shaped identical frame members 20 and 22. Members 20 and 22 are joined at one side with a hinge 24. Members 20, 22, and hinge 24 are integrally made of the same plastic material and are preferably formed by an injection molding process, forming the living hinge 24.

Hinge 24 allows members 20 and 22 to be folded in a manner to capture and compress the filter media 12 therebetween. Filter media 12 may comprise any of the fibrous and/or synthetic materials well known in the filter art. Members 20 and 22 are retained in the folded position by the walls of the filter track 16. The filter media, compressed between members 20 and 22, functions to form an effective seal which minimizes air leakage from filter track 16 while allowing air to flow perpendicularly therethrough.

In use, filter media 12 is placed between grid members 20, 22 and the unit is inserted in filter track 16. When the filter media becomes saturated with dust and pollen, the unit is removed and the filter media is replaced. The grid 14 is reusable for essentially a lifetime under normal conditions. As mentioned above, the grid 14 is sized to fit a standard 20×25 inch filter track. By merely using a sharp pair of shears a homeowner may trim the grid to fit tracks smaller than the popular standard.

It is to be understood that the present invention is not limited to the embodiment described above, but encompasses any and all embodiments within the scope of the following claims.

I claim:

1. In combination, a furnace having a filter track and an air filter assembly removably disposed along the filter track of the furnace, said filter assembly comprising:

a filter frame having two identical rectangularly-shaped grid members;

each of said grid members includes a plurality of uniformly shaped grid openings distributed uniformly therethrough;

means for joining said grid members along one side thereof, so that said grid members are foldable toward each other;

an air filter media positioned between the folded grid members whereby to form said air filter assembly;

wherein said grid members are retained in the folded disposition by the filter track of the furnace.

2. The combination furnace and air filter assembly as defined in claim 1 wherein said means for joining said grid members is a hinge.

3. The combination of the furnace and air filter assembly as defined in claim 2 wherein said grid members are made of plastic.

4. The combination of the furnace and air filter assembly as defined in claim 2 wherein said hinge is made of plastic.

5. The combination of the furnace and air filter assembly as defined in claim 2 wherein said grid members and said hinge are integrally formed.

6. The combination of the furnace and air filter assembly as defined in claim 5 wherein said grid members and said hinge are formed by injection molding.

7. The combination of the furnace and air filter assembly as defined in claim 6 wherein said assembly is dimensioned for installation in a furnace filter track.

8. The combination of the furnace and air filter assembly as defined in claim 7 wherein said filter frame is sized to fit the popular standard 20×25 inch air furnace filter track.

\* \* \* \* \*